United States Patent
Olivieri et al.

(10) Patent No.: US 8,655,917 B2
(45) Date of Patent: Feb. 18, 2014

(54) CUSTOM WEB SERVICES DATA LINK LAYER

(75) Inventors: Davide Olivieri, Rome (IT); Fabio Cristini, Sondrio (IT); Gianfranco Monteduro, Morciano di Leuca (IT); Luca Pariscenti, Crema (IT); Marco Calabretta, Catanzaro (IT); Roberto Dell'Oro, Civo (IT); Francesco Antonio Murru, Olzai (IT)

(73) Assignee: Accenture Global Services Limited, Dublin (IE)

( * ) Notice: Subject to any disclaimer, the term of this patent is extended or adjusted under 35 U.S.C. 154(b) by 177 days.

(21) Appl. No.: 13/016,795

(22) Filed: Jan. 28, 2011

(65) Prior Publication Data

US 2012/0124094 A1    May 17, 2012

(30) Foreign Application Priority Data

Nov. 12, 2010  (EP) .................................. 10425351

(51) Int. Cl.
    *G06F 17/30*          (2006.01)
(52) U.S. Cl.
    USPC ............ 707/792; 707/803; 707/806; 707/705
(58) Field of Classification Search
    USPC ................. 707/792, 999.004, 803, 806, 705
    See application file for complete search history.

(56) References Cited

U.S. PATENT DOCUMENTS

| | | | | |
|---|---|---|---|---|
| 5,903,887 | A * | 5/1999 | Kleewein et al. ...... | 707/999.002 |
| 6,564,218 | B1 * | 5/2003 | Roth ....................... | 707/999.001 |
| 6,725,227 | B1 * | 4/2004 | Li .......................... | 707/999.102 |
| 6,934,699 | B1 * | 8/2005 | Haas et al. ............. | 707/999.002 |
| 7,240,046 | B2 | 7/2007 | Cotner et al. | |
| 2002/0107835 | A1 | 8/2002 | Coram et al. | |
| 2002/0198883 | A1 * | 12/2002 | Nishizawa et al. ...... | 707/999.01 |
| 2005/0262059 | A1 | 11/2005 | White | |
| 2007/0203890 | A1 * | 8/2007 | Sareen et al. .......... | 707/999.003 |
| 2007/0276835 | A1 * | 11/2007 | Murthy ................... | 707/999.009 |
| 2008/0229021 | A1 * | 9/2008 | Plamondon ............. | 711/125 |
| 2009/0089254 | A1 * | 4/2009 | Von Kaenel et al. ... | 707/999.003 |
| 2009/0177697 | A1 * | 7/2009 | Gao et al. ............... | 707/999.107 |
| 2010/0161328 | A1 * | 6/2010 | Krumel et al. ......... | 704/236 |
| 2010/0161590 | A1 * | 6/2010 | Zheng et al. ........... | 707/722 |

FOREIGN PATENT DOCUMENTS

EP       1736899       12/2006

OTHER PUBLICATIONS

Li et al., SQS: A Secure XML Querying System, Department of Computer Science, University of Massachusetts Lowell, 2007. Retrieved on Feb. 21, 2013 from http://teaching.cs.uml.edu/~heines/techrpts/Papers/Originals/sqs.pdf.*

(Continued)

*Primary Examiner* — Cindy Nguyen
(74) *Attorney, Agent, or Firm* — Brinks Gilson & Lione

(57) ABSTRACT

A data interface efficiently transports, manages, and provides data transfer. The data transfer may happen between a data storage layer and a presentation layer, as examples. The presentation layers may be graphical user interfaces that display or report complex data sets, with the data storage layer providing the source data for the presentation layers. The data interface implements a data link layer that efficiently caches, stores, and locates query results, while simultaneously handling security. The data link layer may include load balancing, efficient cache refresh, and other features.

17 Claims, 7 Drawing Sheets

(56) References Cited

OTHER PUBLICATIONS

Heines, 'Index of /~heines/techrpts/Papers' displaying Apr. 3, 2007 publication date of Li (SQS) reference. Retrieved on Feb. 21, 2013 from http://teaching.cs.uml.edu/~heines/techrpts/Papers/Originals/.*

European Search Report from parent EP Application No. 10425351.3-2201 dated Aug. 5, 2011.
Microsoft, XML for Analysis Specification, version 1.0, 72pp., Apr. 24, 2001.
Australian Examination Report No. 1 dated Dec. 7, 2012 in Australian Patent Application No. 2011250696 (4 pages).

* cited by examiner

CUSTOM WEB SERVICES DATA LINK LAYER

PRIORITY CLAIM

This application claims the priority benefit of European Patent Office application serial number 10425351.3, filed Nov. 12, 2010, titled Custom Web Services Data Link Layer.

BACKGROUND OF THE INVENTION

1. Technical Field

This disclosure relates to providing data to presentation layers from a data storage layer. In particular, this disclosure relates to a data link layer that efficiently handles dataflow between a data storage layer and potentially many data presentation layers.

2. Related Art

Data analysis systems continue to evolve in terms of their capability and complexity. For example, U.S. Patent Pub. No. 2009/0307054, which is incorporated herein by reference in its entirety, describes a consumer and shopper analysis system that collects, normalizes, processes, and presents complex data and data analysis results as part of a sophisticated analysis system for analyzing customer behavior. The analysis system adeptly manages significant information flow from both internal and external sources that drives the analyses. In doing so, the analysis system manages data obtained from multiple different systems, integrates the data to provide a single data source of high integrity, and delivers precise information in a timely and accessible manner to business executives at all levels of the enterprise. The analysis system executes sophisticated analyses of the data to provide valuable insights into company performance to allow the company executives to make effective decisions.

In the analysis system described in the patent application noted above, a presentation layer displays the analyses results. The data that drives the analyses results resides in a data storage layer. Because of the immense amount of data that may reside in the data storage layer, and because many instances of the presentation layer may be making simultaneous access demands to the data storage layer for significant amounts of data, a need exists to efficiently transport, manage, and provide the data between the data storage layer and the presentation layer and to handle the simultaneous access demands. Significant technical challenges reside in providing the required data from the data storage layer to the presentation layer in a time, processing, and storage efficient manner.

SUMMARY

A data link layer interfaces a data storage layer to potentially many presentation layers. The data link layer may be implemented in a machine in which a presentation layer interface is operative to receive a data query for a primary data store from a requesting presentation layer. In the machine, the presentation layer interface may be part of the data link layer.

The data link layer includes a query handler operable to identify a query filter parameter for the data query, identify a security specifier for the data query, and identify a query statement for the data query. The query handler also forms a search key comprising the query filter specifier, the security specifier, and the query statement.

A data cache in communication with the data link layer stores cached query results obtained from the primary data store. In one implementation, a cached query result includes a query result key and a query result data entity linked to the query result key. In the data link layer, a search handler searches the data cache to match the search key to the query result key. The search handler thereby determines that the query result data entity already exists for the data query in the data cache. The search handler may then return the query result data entity to the requesting presentation layer through the presentation layer interface.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The innovations may be better understood with reference to the following drawings and description. In the figures, like reference numerals designate corresponding parts throughout the different views.

DETAILED DESCRIPTION

Figure 1:
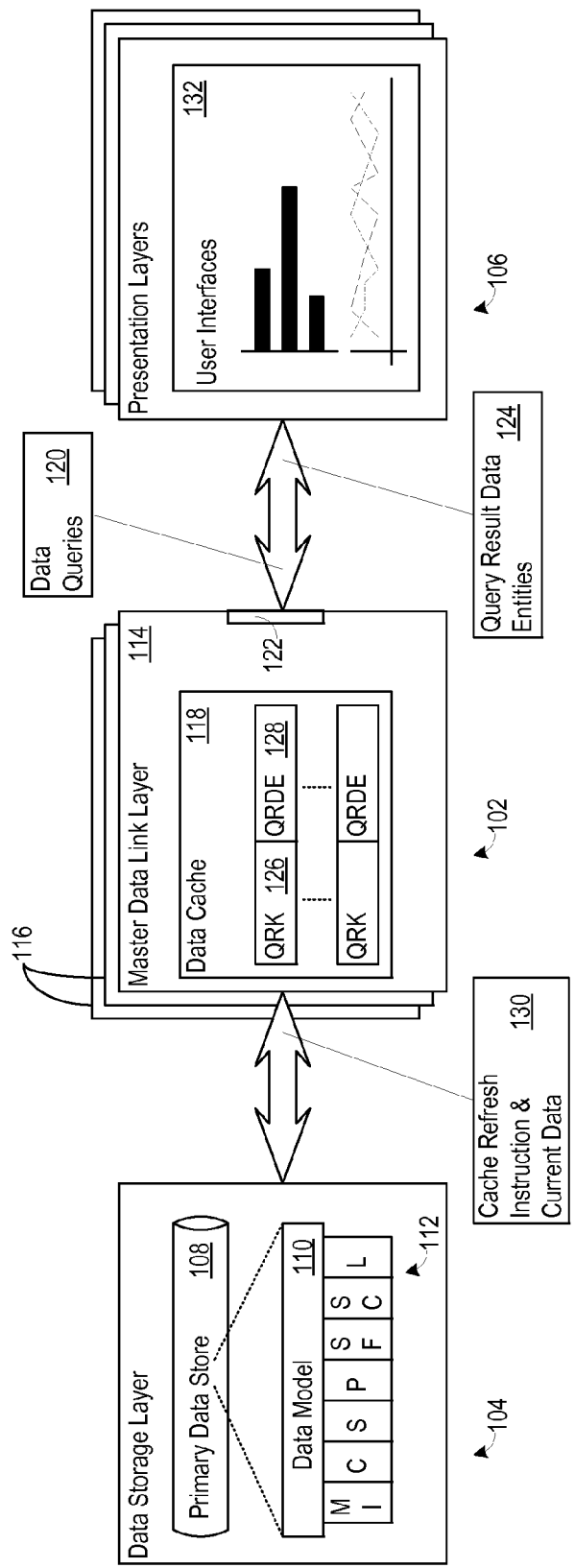
FIG. 1 shows a data handling architecture (e.g., for implementation in a machine) in which data link layer instances communicate between a data storage layer and presentation layers.

FIG. 1 shows a data handling architecture 100 (e.g., implemented in a machine) in which data link layers 102 communicate between a data storage layer 104 and presentation layers 106. There may be one or more data link layers 102 and one or more presentation layers 106. The data link layers 102 may be, for example, different instances or threads of data link layer logic executed in memory by a processor. The data link layers 102 handle data flow between the data storage layer 104 and the presentation layers 106. The presentation layers 106 may be, for example, different instances or threads of presentation layer logic that makes data requests to the data storage layer 104.

The data storage layer 104 includes a primary data store 108. The primary data store 108 may be a database, a flat file, or any other mechanism or data structure that stores data, whether in semiconductor memory, on hard disk, or in other types of memory. In one implementation, a data model 110 organizes the data in the primary data store 108 according to any desired set of tables, relationships, keys, or other characteristics. A database management system may implement either or both of the primary data store 108 and data model 110, for example.

With respect to customer value management, for instance, the data model 110 may store and organize data for analyzing any aspect of customer behavior as described in U.S. Patent Pub. No. 2009/0307054. Specifically, the data model 110 may segment the data into modules 112 (or other units, tables, sets of tables, or segments), such as a Market Insight module, a Customer module, a Sales module, a Promotion module, a Sales Force module, a Supply Chain module, and a Logistics module. However, the primary data store 108 may store any information for any purpose according to any desired organizational structure.

The data link layers 102 cache data obtained from the primary data store 108 for faster, more efficient access by the presentation layers 106. While there are many different possible implementations of the architecture 100, in one implementation, the data link layers 102 include a master data link layer 114 and non-master data link layers 116. Exemplary distinctions in processing are noted below. The data link layers 102 access a data cache 118 in an effort to obtain data responsive to data queries 120 for the primary data store 108 received from requesting presentation layers. The data link layers 102 may receive such data queries 120 through a presentation layer interface 122, and may return query result data entities 124 to the requesting presentation layers. The presentation layer interface 122 may be, as examples, a message passing interface (e.g., a web services interface), a remote procedure call interface, a shared memory interface, or other interface.

The data cache 118 may be implemented with a database, a flat file, or any other mechanism or data structure that stores data. The data cache 118 may be stored in semiconductor memory, on hard disk, or in other types of memory. A database management system may implement the data cache 118.

The data cache 118 may store data from the primary data store 108 in any desired manner. As one example, the data cache 118 stores one or more query result keys (e.g., the query result key (QRK) 126) paired or associated with query result data entities (e.g., the query result data entity (QRDE) 128). The query result key may or may not uniquely identify a query result data entity. The query result key may be formed from one or more pieces of information aggregated together (e.g., concatenated). The pieces of information may include, in one implementation, one or more query filter parameters from a data query, a security specifier, and a query statement from the data query. When a new data query 120 arrives, the data link layer that processes the data query 120 may form a search key in the same way as the query result key, then search for matches for the search key against the query result keys in the data cache 118.

The query filter parameters may be values for variables specified in pre-defined queries. For example, a pre-defined query may include "department" and "salary" filter fields, and the data query may specify values of those variables (effectively "filtering" the results to those values). The security specifier may be a list of groups for the entity associated with (e.g., causing) the data query (e.g., "Supervisors and Engineering"). In other words, the security specifier may be a group membership list for the requesting entity causing the data query. The query statement may be the text of the search statement in the data query 120 or the text of a pre-defined data query specified in the data query 120, as examples.

Accordingly, the query result key 126 captures both the filter parameters, the specific search, and the security information for the entity performing the search. Therefore, the data link layers 104, as a natural part of trying to locate query result data entities, cooperate with the data cache 118 to enforce security, in addition to finding and returning the requested results. Efficient secured control over the data in the primary data store 108 results as part of the natural operation of the data cache 118.

The query result data entity 128 may be any form, type, or structure of data. For example, the query result data entity may be a string, numeric, or other data type. In one implementation, the query result data entity is a binary large object (BLOB) that includes any one or more types of data as a single data chunk. The query result data entity 128 may be the entire result of a query performed against the primary data store 108, and (optionally) compressed and then stored in the data cache 118 for later retrieval and delivery to the presentation layers, without having to re-execute the data query against the primary data store 108.

In some implementations, the data storage layer 104 may communicate cache refresh instructions 130 to the data link layers 102 (e.g., to the master data link layer 114), including a full or partial query result key (or other cache entry identifier) to match against one or more entries in the data cache 118. The data storage layer 104 may also provide current data to the data link layers 102. In response, for example, the master data link layer 114 may update any of the query result data entities 128 with current data from the primary data store 108. One technical benefit is that the cached results of queries are kept up to date in the data cache 118, without the need to re-execute the associated search in the primary data store 108 every time that query result data changes in the primary data store 108. In particular, the data storage layer 108 may keep the results of regular, expected, frequent, or any other specified queries consistently up to date in the data cache 118.

The presentation layers 106 obtain data from the data link layers 102 or the data storage layer 104. The presentation layers 106 process the data and generate user interfaces 132 of any type and content desired. For example, the presentation layers 106 may graphically illustrate any aspect of customer value management as described in U.S. Patent Pub. No. 2009/0307054.

Figure 2:
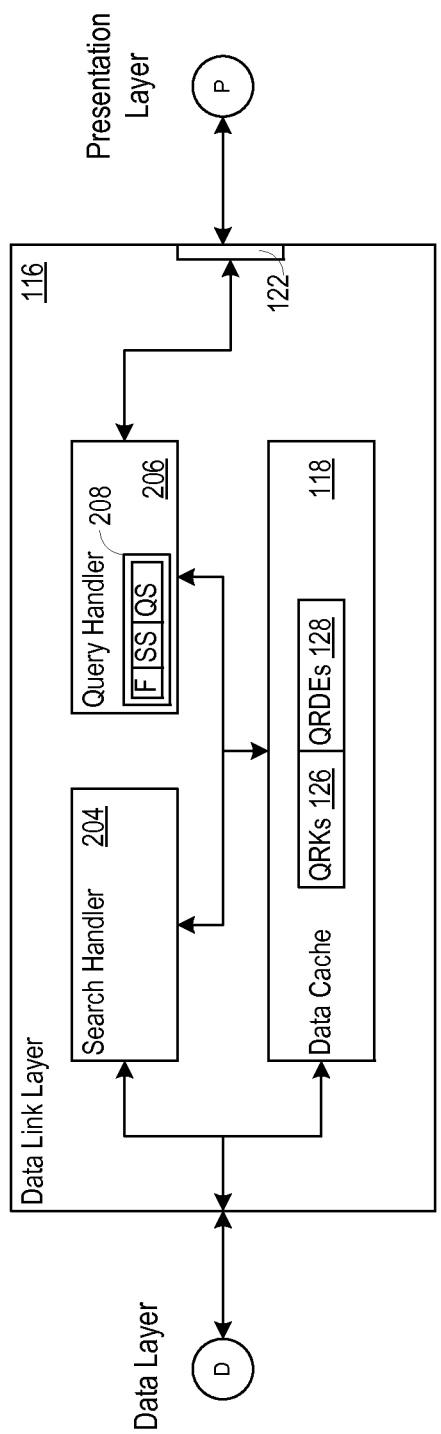
FIG. 2 shows a data link layer.

FIG. 2 shows an example implementation of a non-master data link layer 116. In particular, the data link layer 116 accesses or includes the data cache 118, a search handler 204, and a query handler 206. The query handler 206 includes logic operable to identify a query filter parameter for the data query 120, a security specifier for the data query 120, and a query statement for the data query 120. The query handler 206 forms a search key 208 from the query filter specifiers, the security specifiers, and the query statement.

As noted above, the data cache 118 stores cached query results obtained from the primary data store 108. Each cached query result may include a query result key 126 and a query result data entity 128 linked or associated with the query result key 126. The data cache 118 may be a database, flat file, or other mechanism for storing data. There may be a single data cache 118 in the architecture 100 which all of the data link layers 102 search for existing query result data entities, or there may be multiple instances of the data cache 118.

The search handler 204 includes logic operative to search the data cache 118. For example, the search handler 204 may match the search key 208 against the query result keys 126 to determine that the query result data entity 128 already exists for the data query. If the query result data entity 128 already exists, the search handler 204 may return the query result data entity 128 to the requesting presentation layer through the presentation layer interface 122. In one implementation, the data link layer instance that has searched the data cache 118 also retrieves the query result data entity 128. In other implementations, the search handler 204 searches the data cache 118 and if a matching query result key is found, the search handler 204 requests the query result data entity 128 from a master data link layer 114, receives the query result data entity 128 from the master data link layer 114, and then returns the query result data entity 128 to the requesting presentation layer. In other words, the master data link layer 114 may be responsible for retrieving query result data entities from the data cache 118 for the various instances of the data link layers.

Figure 3:
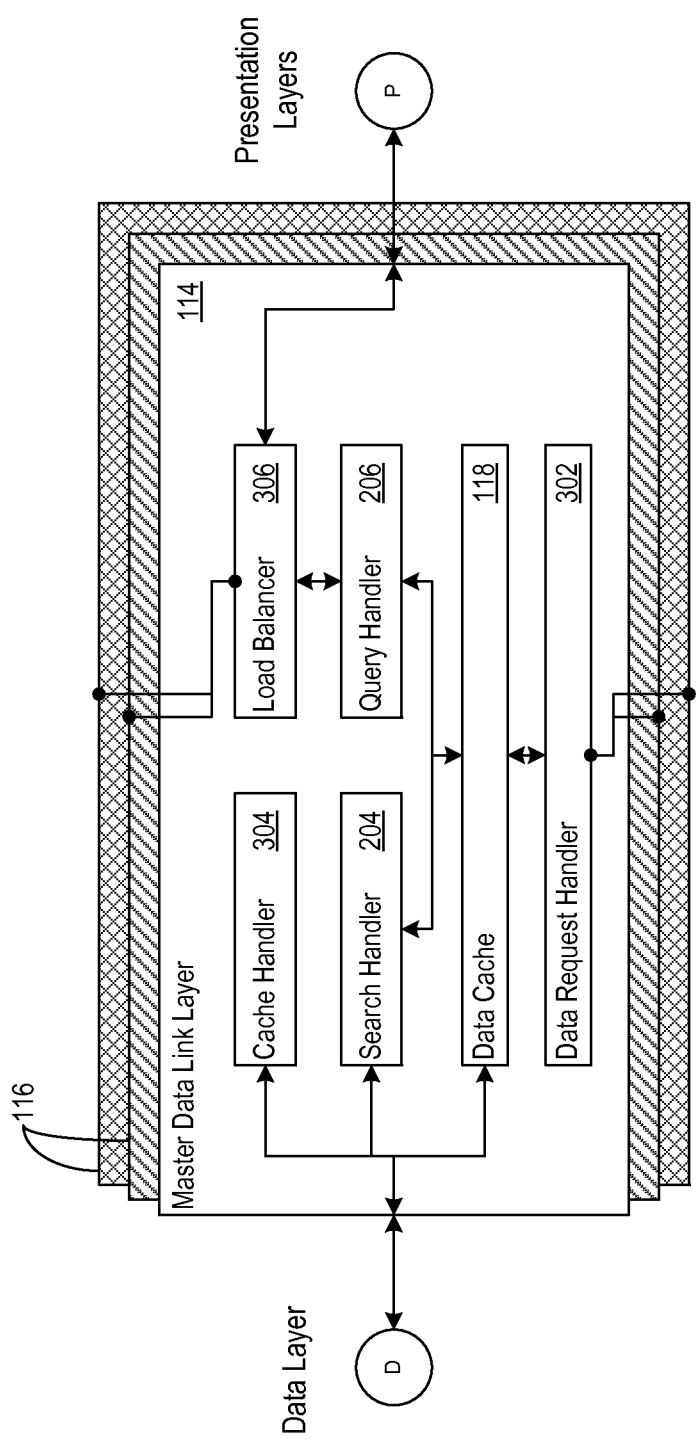
FIG. 3 shows a master data link layer.

FIG. 3 shows an example implementation of a master data link layer 114. In addition to the search handler 204 and query handler 206, the master data link layer 114 may include a data request handler 302, a cache handler 304, and a load balancer 306. The data request handler 302 includes logic that responds to requests for query result data entities from individual data link layer instances 116. Thus, the data request handler 302 accepts requests for query result data entities, retrieves the requested query result data entity from the data cache 118, and returns the query result data entity to the requesting data link layer instance. One technical advantage of having the master data link layer 114 centrally handle the requests for query result data entities is that the data cache implementation may change (e.g., between a database and a flat-file) without the need to completely reconfigure each data link layer to recognize the change and operate correctly given the change to the data cache 118.

In some cases, a data query 120 may be a bundled data query that includes multiple individual data queries aggregated together (e.g., as a batch of queries from a given presentation layer instance). As one example, the bundle may be formed on the presentation layer side by a bundling process that waits for a certain time after for additional data queries after receiving a data query from the presentation layer. The bundling process may then pass the multiple individual data queries to the data link layer 102.

The load balancer 306 may distribute any received data query, or any of the individual data queries from a bundled data query, to any of the data link layer instances (including the master data link layer). Thus, in one implementation, the presentation layer instances send their data queries to the load balancer 306 which distributes them to data link layer instances according to any desired load balancing technique (e.g., round-robin). In other implementations, there is no load balancer 306 in the master data link layer 114, but presentation layers 102 communicate data requests through a separate load balancer (e.g., a hardware load balancer), which in turn distributes the data queries to the various data link layer instances according to the selected load balancing technique.

The cache handler 304 facilitates updates to the data in the data cache 118. In particular, the cache handler 304 may include logic operative to receive a cache refresh instruction and responsively update one or more query result data entities with current data from the primary data store 108. To that end, the cache handler 304 may search the data cache 118 for entries matching the entries specified in the cache refresh instruction (e.g., by search key or partial key), and replace the data in the data cache 118 with current data received from the data layer 104.

Figure 4:
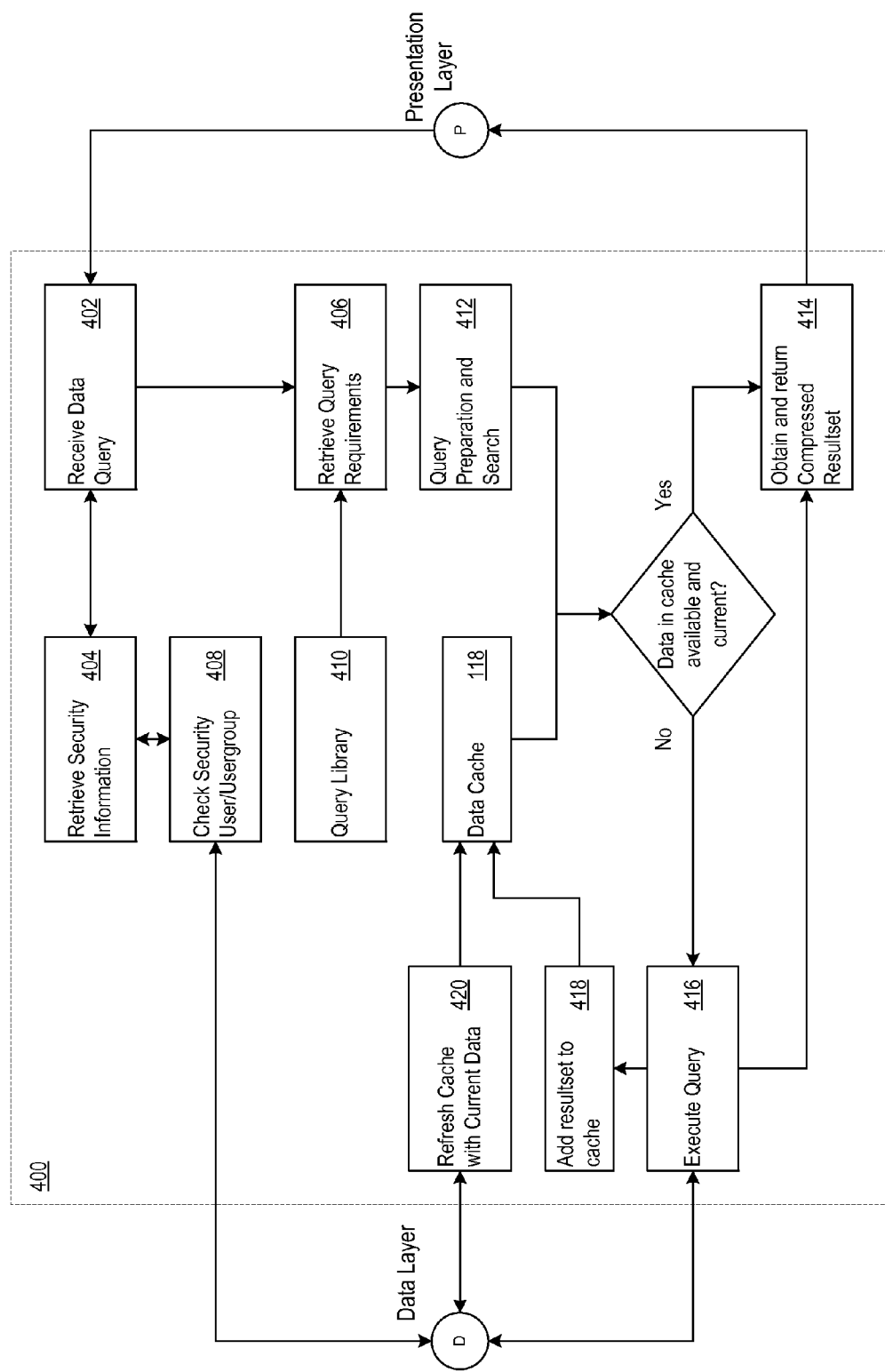
FIG. 4 shows an example of an implementation of a data link layer.

FIG. 4 shows a functional block diagram 400 of a data link layer. At functional block 402, the data link layer receives incoming data queries 120. The data queries 120 may include identifying information (e.g., single sign-on information, security token, session data, a username, or other identifier) that identifies a requesting entity associated with the data query. The functional block 404 obtains security information for the requesting entity, for example by issuing a request to functional block 408 to obtain a group membership list of usergroups to which the requesting entity belongs.

The security information may be provided by a single sign on handler, for example, or by another source of security information. More specifically, the data link layer may leverage the integration of the presentation layer with the data layer to obtain, e.g., username and group information. For example, a Microsoft™ Internet Information Service Server may generate a session identifier (a form of security token) when a web user is authenticated (e.g., via username/password). A database server (e.g., Microsoft SQL server) that handles the data cache 118 or primary data store 108 may employ the security token to authorize access to the data cache 118 and data store 108 without requiring the requesting entity to provide, repeatedly, a username and password.

Logic in the data link layers 102 may obtain the current username using in a vendor-specific mechanism (e.g., an Application Programming Interface (API) call). The logic may then fetch the groups for the user from a database using a specific query, by calling an API function, or in another manner. Each particular implementation, depending on the vendor products selected (or custom built solutions), may provide a different method of single sign on (or other security mechanism) across one or more parts of the architecture 100, including the data link layers 102, data storage layers 104, and presentation layers 106. Because the security information forms part of the query result key 126, the data cache 118 implements a security layer independent cache, with built-in security checking, regardless of the type or construction of security information the architecture provides.

Some data queries 120 may specify a pre-defined query (e.g., by number or other identifier) established in the query library 410. In support of such data queries 120, the query library 410 includes any number of pre-defined queries which may include any number of filter parameters that the data query 120 may specify. In other words, a data query 120 may specify a pre-defined query, and the parameters for the query. However, the data queries 120 may instead fully specify a particular search to perform without reference to any particular pre-defined query in the query library 410. Regardless, functional block 406 determines the query requirements (e.g., the required filter parameters) and obtains the query requirements (e.g., by obtaining filter parameters or the specified query from the data query 120).

Functional block 412 prepares the query and executes a search of the data cache 118. In one implementation, the functional block 412 creates a search key for matching against the query result keys in the data cache 118. As discussed above, the search key may by a combination of the query filter parameters, the security specifier, and the query statement for the data query 120, formed in the same manner as the query result keys.

If a matching query result key is present in the data cache 118, then functional block 414 obtains the corresponding query result data entity. In one implementation, the functional block 414 requests that a master data link layer obtain the corresponding query result data entity. The master data link layer retrieves the corresponding query result data entity and returns the corresponding query result data entity to the requesting data link layer. However, any data link layer may itself retrieve, in other implementations, the corresponding query result data entity from the data cache 118. The data link layer returns the search result-set (e.g., the query result data entity) to the requesting presentation layer.

When a matching query result key cannot be located in the data cache 118, functional block 416 executes the specified data query by communicating the data query to the data layer 104. Functional block 418 adds the search result to the data cache 118. In that regard, the search result (optionally compressed) may form a new query result data entity that is stored in the data cache 118. The associated query result key may be set as the search key formed in functional block 412 (e.g., as the combination of query filter parameters, security specifier, and query statement used to build the search key).

The query result data entities stored in the data cache 118 may be a partial or a complete result-set from the primary data store 108 for the data query. In some instances, the result-sets may include significant amounts of data. Nevertheless, the data cache 118 may hold the complete result-sets as individual query result data entities, and may provide the complete result-sets to the requesting presentation layer so that the data layer 104 need not repeatedly perform the search, retrieve the significant amounts of data, and pass the large result-set back to the presentation layer. Accordingly, the data cache 118 makes even large result-sets quickly and efficiently available to requesting presentation layers.

Functional block 420 receives cache refresh instructions and responsively updates the query result data entities with current data from the primary data store. Accordingly, the architecture 100 keeps the query result data entities current with respect to data changes in the primary data store 108. This proactive approach to keeping data current in the data cache 118 helps to avoid inefficient submission of regular, frequent, or selected data queries back to the data layer 104.

The functionality discussed with respect to FIG. 4 may be implemented in hardware, software, or other logic. The functionality may be organized as desired between or across logical modules, programs, or processors as desired. For example, the query handler 206 may be responsible for receiving the data queries (402), retrieving the security information (404), and retrieving the query requirements (406).

Figure 5:
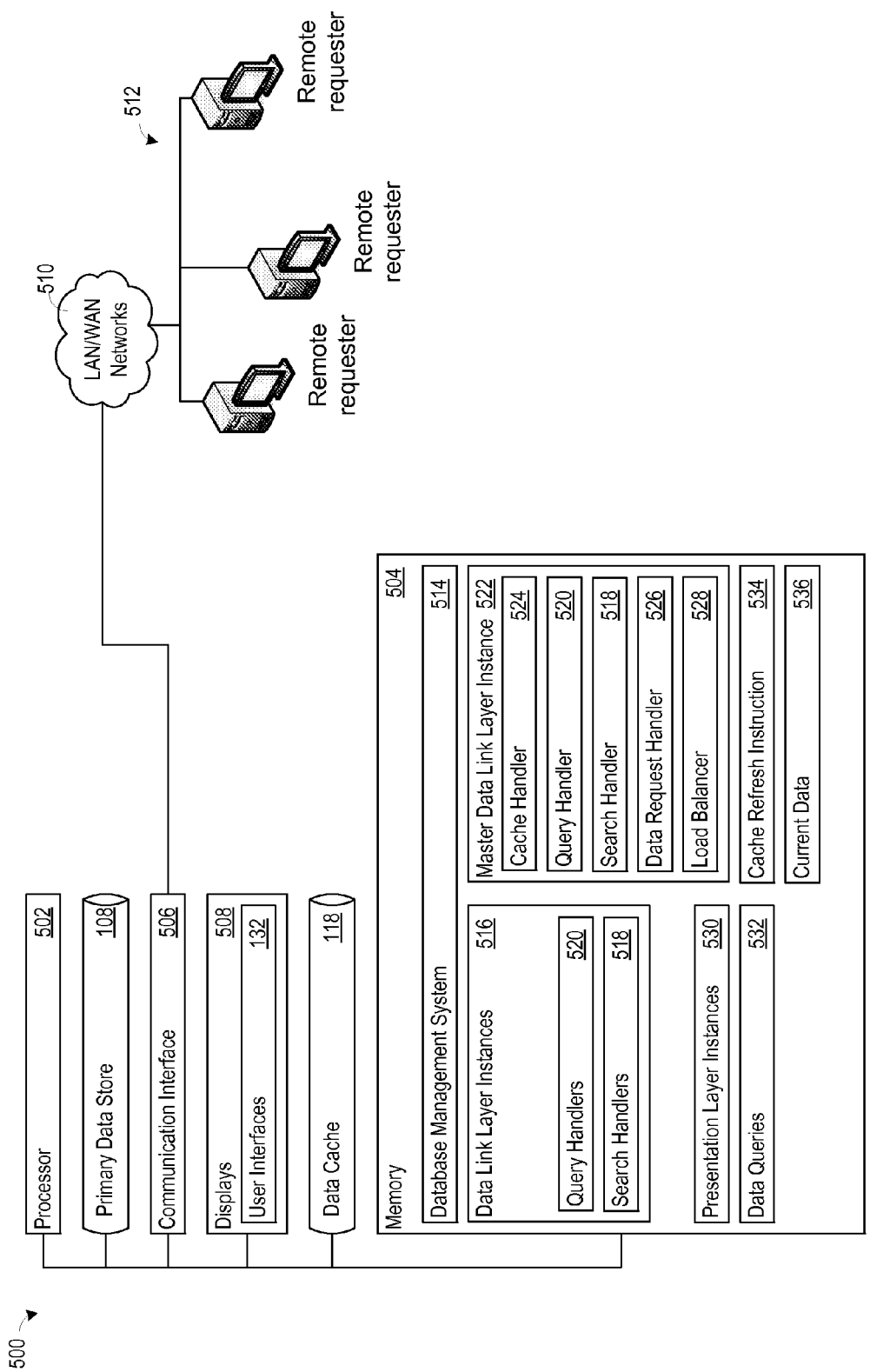
FIG. 5 shows a machine that includes data link layer instances communicating between a data storage layer and local and remote presentation layers.

FIG. 5 shows a machine 500 that includes data link layer instances communicating between a data storage layer and local and remote presentation layers. In particular, a processor 502 is in communication with a memory 504, a communication interface 506, displays 508, a primary data store 108, and a data cache 118. The communication interface 506 may connect the machine 500 over the network(s) 510 to remote systems 512. The remote systems 512 may submit data queries 120, for example, to the machine 500, and may include their own local presentation layers driven by the results of the data queries.

In memory in the machine 500 may be a database management system (DBMS) 514. The DBMS 514 may implement and manage read/write access to the primary data store 108 and the data cache 118, as examples. In addition, any number of non-master data link layer instances 516 may be running in the memory 504. As described above with reference to FIG. 2, the non-master data link layer instances 516 may include search handler logic 518 and query handler logic 520. Furthermore, a master data link layer instance 522 may be running in the memory 504. As noted above with respect to FIG. 3, the master data link layer instance 522 may include search handler logic 518, query handler logic 520, cache handler logic 524, data request handler logic 526, and load balancer logic 528.

Any number of presentation layer instances 530 may be present in the memory 504. The presentation layer instances 530 generate data queries 532 for the data link layer instances 516, 522 to handle. Furthermore, the DBMS 514 or other cache updating logic may generate a cache refresh instruction 534 with current data 536. The master data link layer instance 522 responds to the cache refresh instruction 534 by updating the corresponding data in the data cache 118 as explained above.

Figure 6:
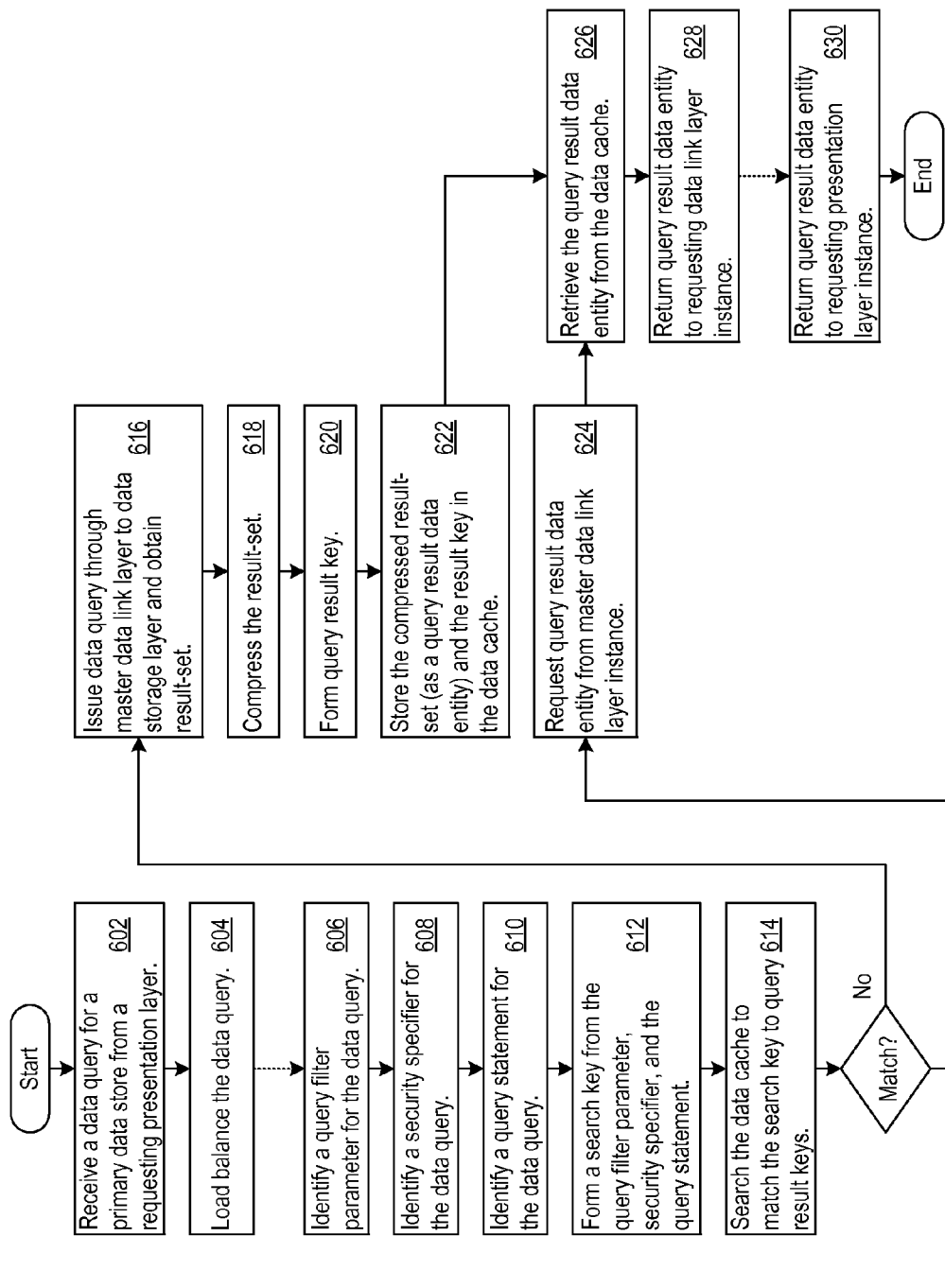
FIG. 6 shows logic that a machine may execute to provide the functionality of a data link layer between a data storage layer and presentation layers.

FIG. 6 shows logic 600 that a machine may execute (e.g., using a processor that executes program instructions) to provide the functionality of a data link layer between a data storage layer and presentation layers. The logic 600 receives a data query for a primary data store 108 from a requesting presentation layer (602). The logic 600 may load balance the data query or any portion of the data query to a specific data link layer (604) that will handle the data query or portion of the data query.

The logic 600 in the specific data link layer identifies a query filter parameter (606), a security specifier (608), and a query statement (610) for the data query. The logic 600 then forms a search key from the query filter parameter, security specifier, and query statement (612). The logic 600 performs a search of the data cache 118, for example, by attempting to match the search key to the query result keys in the data cache 118 (614).

When the data cache 118 does not hold a matching query result data entity, then the logic 600 issues the data query to the data storage layer 104 (616). A master or non-master data link layer instance may submit the data query to the data storage layer 104. The data storage layer 104 provides a result-set, which the logic 600 may compress (618) for storage in the data cache 118. Furthermore, the logic 600 forms a query result key (620), and stores the compressed result-set as a query result data entity along with the result key in the data cache 118 (622). When the data cache 118 holds a matching query result data entity, then the logic 600 requests the matching query result data entity, e.g., from the master data link layer instance (624).

In either case, the logic 600 retrieves the query result data entity from the data cache 118 (626). The query result data entity is returned to the requesting data link layer instance (628). In response, the requesting data link layer instance returns the query result data entity (either compressed or uncompressed, as desired or requested by, e.g., the presentation layer) to the presentation layer instance that made the data query (630).

Figure 7:
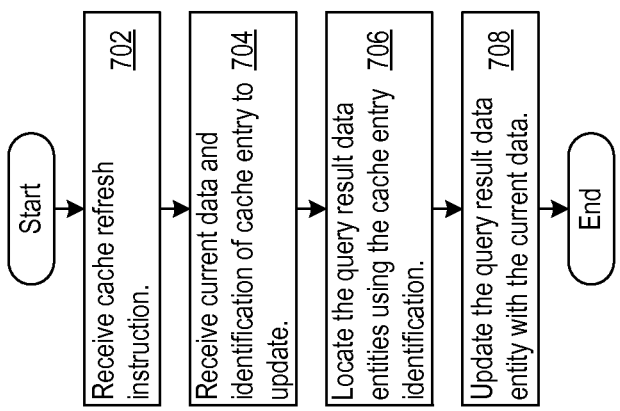
FIG. 7 shows logic that a machine may execute to refresh query result data entities stored in a data cache.

FIG. 7 shows logic 700 (e.g., implemented in a master data link layer 114) that a machine may execute to refresh query result data entities stored in a data cache. The logic 700 receives a cache refresh instruction (702), along with current data and an identification of one or more cache entries to update (704). The logic 700 matches the identification against the cache entries (e.g., against the query result keys) to locate the query result data entities to update (706). The logic 700 updates the located query result data entities with the current data (708).

In the description above, various implementations of the data link layer were described. For example, a machine may include a presentation layer interface operative to receive a data query for a primary data store from a requesting presentation layer, and a data link layer in communication with the presentation layer interface. The data link layer may include a query handler operable to identify a query filter parameter for the data query, identify a security specifier for the data query, identify a query statement for the data query, and form a search key comprising the query filter specifier, the security specifier, and the query statement.

In addition, the machine may include a data cache comprising cached query results obtained from the primary data store. Each cached query result may include a query result key and a query result data entity linked to the query result key. The machine may further include a search handler operative to search the data cache to match the search key to the query result key to determine that the query result data entity already exists for the data query in the data cache, and return the query result data entity to the requesting presentation layer through the presentation layer interface.

The security specifier may comprise a group membership list for a requesting entity causing the data query. The query result data entity may comprise a complete result-set from the primary data store for the data query. The complete result-set may comprise a compressed complete result-set.

In the machine, the search handler may be further operative to request the query result data entity from a master data link layer instance and receive the query result data entity from the master data link layer instance. Also, the data query may comprise a bundled data query comprising multiple individual data queries, and the machine may further include a load balancer operative to distribute the multiple individual data queries to individual instances of the data link layer.

The machine may further comprise a cache handler in communication with the data cache, the cache handler operative to receive a cache refresh instruction and responsively update the query result data with current data from the primary data store. The data cache may be a database, a flat file, or both a database and a flat-file.

In terms of the processing performed to accomplish the technical solutions described above, the processing may include receiving a data query against a primary data store from a requesting presentation layer through a presentation layer interface, and forming a search key comprising a query filter parameter for the data query, a security specifier for the data query, and a query statement for the data query. The processing may further include caching query results in a data cache, each query result comprising a query result key and a query result data entity linked to the query result key. Also, the processing may include matching the search key to the query result key to determine that the query result data entity already exists for the data query in the data cache and returning the query result data entity to the requesting presentation layer through the presentation layer interface.

In other implementations, the data link layer functionality may be provided in a product comprising a machine readable medium, and logic stored on the machine readable medium. The logic, when executed by a processor, causes the processor to receive a data query against a primary data store from a requesting presentation layer through a presentation layer interface, form a search key comprising a query filter parameter for the data query, a security specifier for the data query, and a query statement for the data query. The logic also causes the processor to cache query results in a data cache, each query result comprising, a query result key and a query result data entity linked to the query result key. The logic also causes the processor to match the search key to the query result key to determine that the query result data entity already exists for the data query in the data cache, and to return the query result data entity to the requesting presentation layer through the presentation layer interface.

In general, the logic, handlers (e.g., the search handler, query handler, cache handler, and data request handler), load balancer, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions that perform the processing described above, or in software in an application programming interface (API) or in a Dynamic Link Library (DLL), functions available in a shared memory or defined as local or remote procedure calls, or as a combination of hardware and software. The logic may be functionally partitioned to meet to goals of any specific implementation.

The systems may include additional or different logic and may be implemented in many different ways. A processor may be implemented as a controller, microprocessor, digital signal processor, microcontroller, application specific integrated circuit (ASIC), discrete logic, or a combination of other types of circuits or logic. Similarly, memories may be Dynamic Random Access Memory (DRAM), Static Random Access Memory (SRAM), Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, implemented in libraries such as Dynamic Link Libraries (DLLs), or distributed across several memories, processors, cards, and systems.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
   a processor coupled with a computer network interface and a memory, the memory having logic stored thereon, the logic which when executed by the processor causes the processor to:
   receive, via a presentation layer interface stored on the memory, a data query for a primary data store from a requesting presentation layer; and
   store on the memory a data link layer that is in communication with the presentation layer interface, the data link layer comprising:
   a query handler operable to:
     identify a query filter parameter for the data query;
     retrieve identifying information for a requesting entity causing the data query;
     identify a group membership list of usergroups to which the requesting entity belongs based on the identifying information;
     identify a security specifier of the requesting entity to authorize access to the primary data store for the data query, the security specifier comprising the group membership list;
     identify a query statement for the data query; and
     form a search key comprising the query filter parameter, the security specifier, and the query statement;
   a data cache comprising cached query results obtained from the primary data store, each cached query result comprising:
     a query result key comprising a query filter parameter for the cached query result, a security specifier of the requesting entity for the cached query result, and a query statement for the cached query result; and
     a query result data entity linked to the query result key;
   a search handler operative to:
     search the cached query results to match the query filter parameter, the security specifier, and the query statement of the search key to the query filter parameter, the security specifier, and the query statement of the query result key to determine that the query result data entity already exists for the data query in the data cache; and
return the query result data entity to the requesting presentation layer through the presentation layer interface.

2. The system of claim 1, where the query result data entity comprises a complete result-set from the primary data store for the data query.

3. The system of claim 2, where the complete result-set comprises a compressed complete result-set.

4. The system of claim 1, where the search handler is further operative to:
request the query result data entity from a master data link layer; and
receive the query result data entity from the master data link layer.

5. The system of claim 1, further comprising:
a load balancer operative to distribute the data query to an individual instance of the data link layer.

6. The system of claim 1, further comprising:
a cache handler in communication with the data cache, the cache handler operative to receive a cache refresh instruction and responsively update the query result data entity with current data from the primary data store.

7. The system of claim 1, where the data cache comprises a database, a flat file, or both a database and a flat-file.

8. A method comprising:
receiving a data query against a primary data store from a requesting presentation layer through a presentation layer interface;
retrieving identifying information for a requesting entity causing the data query;
identifying a group membership list of usergroups to which the requesting entity belongs based on the identifying information;
forming a search key comprising:
a query filter parameter for the data query;
a security specifier of the requesting entity to authorize access to the primary data store for the data query, the security specifier comprising the group membership list; and
a query statement for the data query;
caching query results in a data cache, each cached query result comprising:
a query result key comprising a query filter parameter for the cached query result, a security specifier of the requesting entity for the cached query result, and a query statement for the cached query result; and
a query result data entity linked to the query result key;
matching the query filter parameter, the security specifier, and the query statement of the search key to the query filter parameter, the security specifier, and the query statement of the query result key to determine that the query result data entity already exists for the data query in the cached query results; and
returning the query result data entity to the requesting presentation layer through the presentation layer interface.

9. The method of claim 8, where caching comprising:
caching a complete result-set from the primary data store for the data query as the query result data entity.

10. The method of claim 9, further comprising:
compressing the complete result-set for storage in the data cache.

11. The method of claim 8, further comprising:
requesting the query result data entity from a master data link layer; and
receiving the query result data entity from the master data link layer.

12. The method of claim 8, where the data query comprises a bundled data query comprising multiple individual data queries, and further comprising:
load balancing the multiple individual data queries to individual instances of the data link layer.

13. The method of claim 8, further comprising:
receiving a cache refresh instruction and responsively updating the query result data entity with current data from the primary data store.

14. A product comprising:
a non-transitory computer readable medium; and
logic stored on the non-transitory computer readable medium that, when executed by a processor, causes the processor to:
receive a data query against a primary data store from a requesting presentation layer through a presentation layer interface;
retrieve identifying information for a requesting entity causing the data query;
identify a group membership list of usergroups to which the requesting entity belongs based on the identifying information;
form a search key comprising:
a query filter parameter for the data query;
a security specifier of the requesting entity to authorize access to the primary data store for the data query, the security specifier comprising the group membership list; and
a query statement for the data query;
cache query results in a data cache, each cached query result comprising:
a query result key comprising a query filter parameter for the cached query result, a security specifier of the requesting entity for the cached query result, and a query statement for the cached query result; and
a query result data entity linked to the query result key;
match the query filter parameter, the security specifier, and the query statement of the search key to the query filter parameter, the security specifier, and the query statement of the query result key to determine that the query result data entity already exists for the data query in the cached query results; and
return the query result data entity to the requesting presentation layer through the presentation layer interface.

15. The product of claim 14, where the query result data entity comprises:
a complete result-set from the primary data store for the data query.

16. The product of claim 14, where the logic further causes the processor to:
request the query result data entity from a master data link layer; and
receive the query result data entity from the master data link layer.

17. The product of claim 16, where the logic further causes the processor to:
receive a cache refresh instruction and responsively update the query result data entity with current data from the primary data store.

* * * * *